United States Patent [19]

Fey et al.

[11] Patent Number: 5,357,177

[45] Date of Patent: Oct. 18, 1994

[54] ELECTRICAL ADJUSTMENT DEVICE

[75] Inventors: Rainer Fey, Schweinfurt; Albert Thein, Hassfurt, both of Fed. Rep. of Germany

[73] Assignee: Fichtel & Sachs AG, Schweinfurt, Fed. Rep. of Germany

[21] Appl. No.: 31,523

[22] Filed: Mar. 15, 1993

[30] Foreign Application Priority Data

Apr. 13, 1992 [DE] Fed. Rep. of Germany ....... 4212320

[51] Int. Cl.$^5$ ...................... B62M 19/00; F16H 63/00
[52] U.S. Cl. ............................................. 318/3; 318/4; 318/5; 474/110; 474/70; 474/80
[58] Field of Search ............................ 318/3, 280–293, 318/430–477, 4, 5; 474/80–87, 101–103, 70–80, 110, 116; 192/142 R; 198/807; 280/238, 206, 261; 364/426.04

[56] References Cited

U.S. PATENT DOCUMENTS

| 3,919,891 | 11/1975 | Stuhlmuller et al. ............. 74/217 B |
| 4,143,557 | 3/1979 | Wakebe et al. .................... 74/217 B |
| 4,490,127 | 12/1984 | Matsumoto et al. ................ 474/110 |
| 4,605,240 | 8/1986 | Clem et al. ......................... 280/236 |
| 4,946,425 | 9/1990 | Buhlmann ............................ 474/80 |
| 5,059,158 | 10/1991 | Bellio et al. ........................ 474/70 |
| 5,121,936 | 6/1992 | Cowan ................................ 280/236 |
| 5,163,881 | 11/1992 | Chattin .............................. 474/78 |
| 5,167,591 | 12/1992 | Cowan ................................ 475/211 |
| 5,213,548 | 5/1993 | Colbert et al. ....................... 474/71 |
| 5,215,323 | 6/1993 | Cowan ................................ 280/236 |

FOREIGN PATENT DOCUMENTS

| 0349086 | 1/1990 | European Pat. Off. . |
| 9117078 | 11/1991 | European Pat. Off. . |
| 4022473 | 1/1992 | Fed. Rep. of Germany . |
| 2587079 | 3/1987 | France . |

Primary Examiner—Paul Ip
Attorney, Agent, or Firm—Braumbaugh, Graves, Donohue & Raymond

[57] ABSTRACT

An electrical adjustment device, in particular an electrical chain transfer device for bicycles is disclosed, comprising an adjusting element, a drive device for the adjusting element, a control unit for controlling the drive device and a presetting device connected with the control unit for presetting a plurality of set values, where each of these set values corresponds to an operational position of the adjusting element. In the adjustment device of the invention the adjusting element can be moved into respectively one set position corresponding to a desired operational position for fixing or, if required, correcting of the set values, and the resulting instantaneous value can be stored in the presetting device as the new set value.

8 Claims, 3 Drawing Sheets

ELECTRICAL ADJUSTMENT DEVICE

BACKGROUND OF THE INVENTION

The invention relates to an electrical adjustment device, in particular an electrical chain transfer device for bicycles, comprising an adjusting element which can be set to a plurality of operational positions, a drive device for the selective setting of the adjusting element to respectively one of the operational positions, a control unit for controlling the drive device by issuing signals "change operational position" and signals "operational position achieved" to the drive device, a sensor device connected with the control unit for detecting the instantaneous value of a parameter corresponding to an instantaneous setting of the adjusting element, a presetting device, connected with the control unit, for presetting a plurality of preset values of the parameter, where each one of these preset values corresponds to one of the operational positions of the adjusting element.

STATEMENT OF THE PRIOR ART

Electrical adjusting devices of this type are known. In one of these adjusting devices the presetting device is constituted by a mechanical detent device, the detent marks of which correspond to the operational positions of the adjusting element. When the adjusting element is displaced, a sensor scans these detent marks and sends an appropriate signal to a control unit which transmits the signal "operational position achieved" to the drive device driving the adjusting element, when a desired operational position of the adjusting element has been achieved. In this case the detent device of the conventional adjustment device must be designed to correspond to the particular purpose of use. With electrical chain transfer devices for bicycles, for example, it is necessary to employ a special detent device for each of different chain wheel packages. Thus, different electrical adjustment devices must be provided for different chain wheel packages.

When installing the conventional electrical adjustment devices, it is furthermore necessary to perform two work steps simultaneously, namely that of fastening the adjustment device, for example on the bicycle frame, and that of adjusting the detent device so that the detent marks of the detent device do actually correspond to the desired operational position of the adjusting element of the drive device.

OBJECT OF THE INVENTION

In contrast to this, it is the object of the invention to recite an electrical adjusting device, the installation of which is simplified on the one hand and, on the other, can be universally employed for different operational purposes.

SUMMARY OF THE INVENTION

This object is attained in accordance with the invention in that the adjusting element can be moved into respectively one set position, which corresponds to a desired operational position, for fixing or, if required correcting, the preset values and that the resulting instantaneous value can be stored as the new preset value in the presetting device. By means of this step it is possible to adapt the electrical adjustment device of the invention to the respective use, for example the respectively used chain wheel package, after the latter has been installed, so that it is not necessary to perform the installation with a very high precision. This makes the installation of the electrical adjustment device easier, because fastening and adjusting of the adjustment device can be performed in accordance with the invention separately in two independent work steps and the setting of the adjustment device can be possibly corrected later without it being required to remove the fastening of the adjustment device from the bicycle again. Furthermore, it is possible to adapt the electrical adjustment device of the invention to various chain wheel packages in a simple manner, because the set values corresponding to the desired operational positions can be stored in the presetting device and therefore can always be changed in number and value.

The possibility of changing the set values stored in the presetting device can be provided in a simple manner in that the presetting device is an erasable and reprogrammable fixed value memory.

It is provided by an embodiment of the invention that the control unit has a controlling microchip and that the presetting device is operationally connected with the microchip. With this embodiment it is possible to utilize mass-produced components, which are thus available at low prices, in the electrical adjustment device.

However, it is also alternatively possible for the control unit to have a controlling microchip and that the presetting device is integrated into the microchip. In this way it is possible to design the control unit of the electrical adjustment advice in a particularly space-saving manner.

In order to prevent that, because of an error in the control (open-loop control) of the drive device, the adjusting element is set to an incorrect desired operational position, it is suggested that the control unit comprises a comparator for comparing the respective instantaneous value of the parameter with that of a preset value corresponding to an operational position externally pre-settable, by the user, for example, where the control unit transmits the signal "change operational position" when the comparator detects lack of agreement between the instantaneous value and the preset value, and transmits the signal "operational position achieved", when the comparator detects agreement between the instantaneous value and the preset value. Thus, in accordance with the invention the drive device can set the adjusting element to the desired operational position in a controlled manner (closed-loop control).

The invention furthermore relates to a chain transfer for a bicycle with at least one electrical adjustment device in accordance with the invention.

In addition, the invention relates to a method for fixing and, if required, correcting operational positions of an electric adjustment device, particularly of an electrical chain transfer device for bicycles as previously described. With the method of the invention the adjusting element is moved in a first step into respectively one set position correspondiing to a desired operational position and the resulting instantaneous value is subsequently stored in the presetting device as the new preset value in a second step. The method of the invention allows an optimal adaptation of the adjustment device to a multitude of positioning functions, taking into consideration the totality of tolerances present in the adjustment device.

The various features of novelty which characterize the invention are pointed out with particularity in the claims annexed to and forming a part of the disclosure.

For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWINGS

The invention will be described in detail below by means of exemplary embodiments shown in the attached drawings. Shown are in.

DETAILED DESCRIPTION OF PREFERRED EMBODIMENTS

Figure 1:
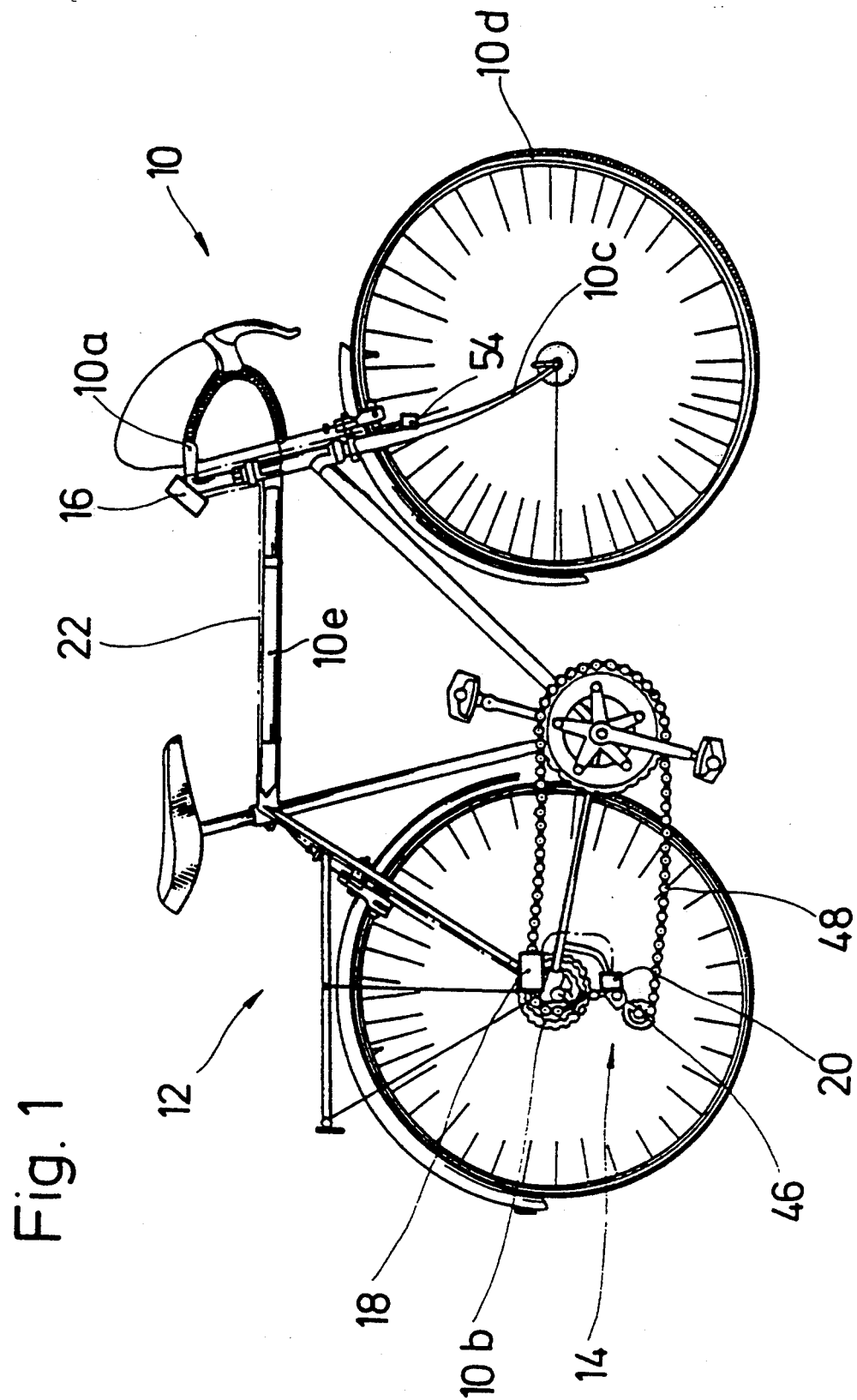
FIG. 1, a lateral view of a bicycle equipped with a control device for an electrical chain transfer device.

A lateral view of a bicycle, identified by 10 hereinbelow, is shown in FIG. 1, which is equipped with a control device 12 for an electric chain transfer device 14. The control device 12 comprises a signal transmitter 16 disposed on the handle bar 10a of the bicycle, by means of which the rider of the bicycle 10 can enter a desired new gear for a gear change, and a control unit 18 disposed in the area of the rear wheel hub 10b for controlling the adjustment member 20 of the chain transfer device 14. The signal transmitter 16 and the control unit 18 are connected with each other via a signal line 22.

The structure and function of the control device will be discussed in detail in what follows by means of FIG. 2.

The signal transmitter 16 comprises an input unit 30, for example a keyboard, by means of which the rider can enter different commands into the signal transmitter 16. For example, during normal riding he can indicate by pushing an "up" key 30a or a "down" key 30b that he wants to ride in the next higher or next lower gear. The entered commands are forwarded by the input unit 30 to a signal monitoring unit 32, which checks the permissibility of the preset shift command. For this purpose the signal monitoring unit 32 has a comparator 38 which compares the desired gear with the gears contained in a multitude of target gears permissible for the presently selected gear. Such a number of permissible target gears is stored for each one of the possible gears of the chain transfer in a memory device 34.

An example of such numbers of target gears is shown in Table 1. For example, it is not permissible in accordance with Table 1 to shift from first gear into third gear. In addition, nonsensical shifting attempts, such as shifting into a non-available fifth gear, are intercepted.

TABLE 1

| Possible Gears | Permissible Target Gears |
| --- | --- |
| 1 | 2 |
| 2 | 1, 3 |
| 3 | 2, 4 |
| 4 | 3 |

If the entered gear is considered to be permissible by the signal monitoring unit 32, an appropriate shift command is forwarded via the signal line 22 to the control unit 18 of the chain transfer device 14. In addition, the permissibility of the desired gear is indicated on a display device 36 of the signal transmitter 16, perhaps by means of a blinking indication of a number corresponding to the desired gear. The display device 36 can be formed by a liquid crystal display, for example.

Once the issued shifting command has been successfully executed by the chain transfer device 14, a signal "command executed" is forwarded to the signal monitoring unit 32. The rider of the bicycle is informed of the successful execution of the switching command by the change of the display device from a blinking to a steady display, for example.

The above described switching command is received by a second signal monitoring unit 40 in the control unit 18. The signal monitoring unit 40 transmits an adjusting signal corresponding to this switching command to a drive device 42 of the adjustment member 20, which thereupon changes an adjusting element 44 of the adjustment member 20.

Figure 2:
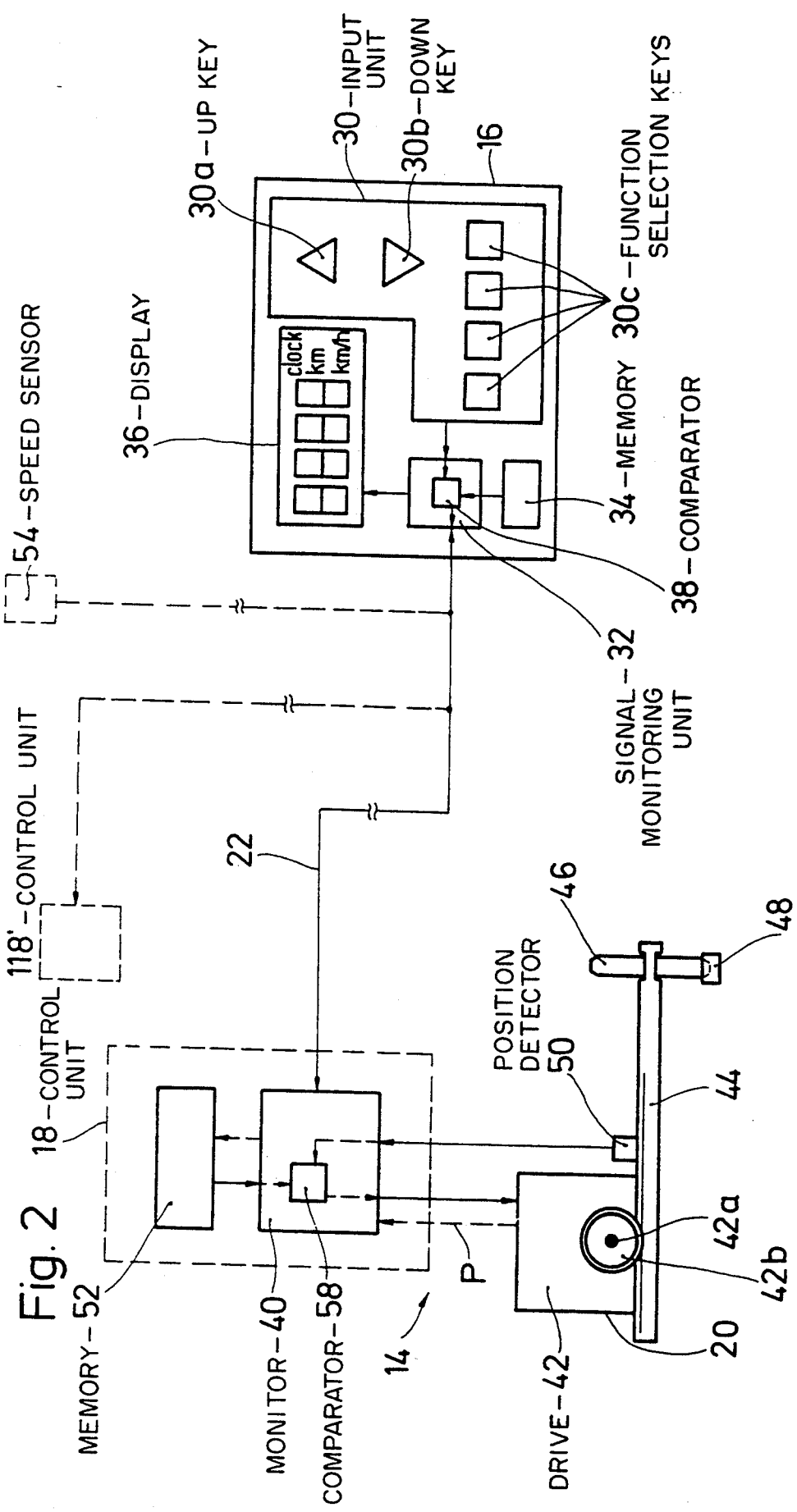
FIG. 2, a schematic view for explaining the function of the control device of the invention.

In FIG. 2 the drive device is schematically shown as an electric motor 42, the output shaft 42a of which is connected with a toothed wheel 42b. The toothed wheel 42b engages the toothing of the adjusting element 44, which is embodied as a toothed rack. A toothed wheel 46 is rotatably seated on one end of the toothed rack 44 and the drive chain 48 of the bicycle 10 is guided over it (also see FIG. 1).

A position detector 50 detects an instantaneous position of the adjusting element 44 and forwards a respective signal to the second signal monitoring unit 40. A comparator 58 provided in the signal monitoring unit 40 compares the actual adjustment value forwarded by the position detector 50 with a set adjustment value for the gear to be newly selected and stored in a memory device 52. If the signal monitoring unit 40 determines the agreement of the set and the actual values, it deactivates the adjustment member 20 and forwards the previously mentioned signal "command executed" to the first signal monitoring unit 32.

It may happen that for some reason the adjustment member 20 is not in a position to set the desired gear. This may happen, for example, because the adjustment member 20 is blocked by dirt or the adjustment member 20 must overcome too high an adjustment resistance because the chain 48 of the bicycle is not being moved fast enough. If no allowances have been made for this case, the drive device 42 of the adjustment member 20 may be permanently damaged because of the continuing attempts to set the desired gear.

To be able to prevent such damage, the second monitoring unit 40 can be provided, for example, with a time function element which, when a switching signal is transmitted, is set to a pre-determined time by the first signal monitoring unit 32 and is started, and which is stopped again when the comparator 58 has detected the agreement between the actual adjusting value detected by the position detector 50 and the set value of the adjusting element 44 stored in the memory device 52. If the adjustment member 20 is unable to set the desired gear within the time set by the time function element, the adjustment member 20 is deactivated by the second signal monitoring unit 40 when the time function element has run out and a signal "command cannot be executed" is sent to the first signal monitoring unit 32. Subsequently the signal monitoring unit 32 causes the non-execution of the switching command to be displayed on the display device 36.

It is also possible to provide a current sensor in place of the time function element, which detects the intensity of the supply current for the electric motor 42 and sends an appropriate signal to the second signal monitoring unit 40 (this is indicated in FIG. 2 by the dashed arrow P). If the supply current intensity exceeds a preset value, it is again possible to deactivate the drive device 42 and to send a signal "command cannot be executed" to the first signal monitoring unit 32.

In addition to the above described function of switching back and forth between several gears of the chain transfer, the signal transmitter 16 can also take over other functions, such as display of the time, the instantaneous riding speed, the distance covered or the like. The input unit of the signal transmitter 16 is provided with function keys 30c to call up these functions. In addition, the first signal monitoring unit 32 is connected with a speed sensor 54 which is also connected to the signal line 22, which is embodied as a data bus.

For example, the speed sensor 54 can be formed by a Hall sensor, fixedly disposed on a fork 10c of the bicycle 10, and a permanent magnet disposed on a spoke of the front wheel 10d. Because of the division of the individual functions, which are required for correct switching, to the signal monitoring units 32 and 40, which have been disposed at places distant from each other in accordance with the concept of decentralized intelligence, namely the signal monitoring unit 32 in the signal transmitter 16 on the handlebar 10a and the second signal monitoring unit 40 in the control unit 18 in the area of the rear wheel hub 10b of the bicycle 10, the signal transmission rate via the signal line 22 can be reduced to a minimum. By means of this, falsification of the signals over the long transmission path via the signal line 22 and the danger resulting from this of a malfunction of the control device 12 is at least considerably reduced, if not completely prevented.

To be able to improve further the freedom from interference of the control device 12, the signals are transmitted via the signal line 22 not in analog, but in digital form, because digital signals are much more insensitive against noise than analog signals. To be able to keep the number of lines needed as small as possible, the signal line 22 is embodied as a serial data line. Such a signal line 22 suited for serial digital data transmission can be fashioned from a single-line fiberglass cable. However, it is also possible to use a single-line electrical cable, where the signal data as well as the status data of the signal monitoring units 32 and 40 are transmitted via its line. The frame 10e of the bicycle can be used as the connection with the ground. However, to avoid high transition resistance between the signal monitoring units 32 and 40 and the bicycle frame 10e, it is also possible to provide a second line as ground connection in the electric cable. It is possible to conduct supply voltage to the units 32 and 40 via a third line.

The chain transfer device 14 of the control device 12 is embodied in such a way that during mounting on the bicycle 10 it is first simply attached to it, without it being necessary to take into consideration the exact adjustment of the adjustment member 20 in respect to the chain wheel package of the chain transfer of the bicycle 10 to be changed by it. Adjusting of the adjustment member 20 takes place, after completion of the fastening of the chain transfer device 14 on the bicycle 10, in a separate work step, which will be described later. This makes the mounting of the chain transfer device 14 considerably more easy, because it is not necessary to watch the correct fastening and exact adjustment at the same time.

First, the signal transmitter 16 must be set into the calibration mode for calibrating the adjustment member 20. This is preferably done by the simultaneous pressing of two function keys 30c which are as far apart from each other as possible. It is possible to avoid the accidental setting of the calibration mode by this.

By pushing the "up" key 30a and the "down" key 30b, a gear to be adjusted is then selected. This is followed by entering the adjustment mode for the gear to be adjusted by pushing an appropriate one of the function keys 30c.

By pushing the "up" key 30a and the "down" key 30b it is possible in the adjusting mode to change the adjustment member 20 by means of signals transmitted via the first signal monitoring unit 32, the signal line 22 and the second signal monitoring line 40 step-by-step until the adjusting element 44 has achieved a setting optimal for the gear to be adjusted. By pushing the appropriate function key again, a signal "memorize position" is transmitted by the signal monitoring unit 32 to the second signal monitoring unit 40, whereupon it stores the actual value detected by the position detector 50 in this position in the memory device 52 as the new set value for the gear just to be adjusted. For this purpose the memory device 52 is embodied as an erasable and reprogrammable fixed value memory, for example as an EEPROM.

After this the appropriate function key can be pushed again and a new gear to be adjusted can be set by means of the "up" key 30a or the "down" key 30b.

The above described method is repeated until a set value has been stored in the memory device 52 for all available gears. The calibrating mode is switched off again by renewed pushing of the two function keys which are far apart.

In order to be able to take into consideration mechanical hysteresis between the toothed wheel 42b and the toothed rack 44, it can be provided that two set adjusting values are stored for each possible gear, namely one for upshifting to this gear and one for downshifting to this gear.

The above described calibration mode is, after the mounting of the chain transfer device 14, not only used for storing the set adjusting values in the memory device 52. It is also possible to correct the set adjusting values of any arbitrary gear at any time.

Figure 3:
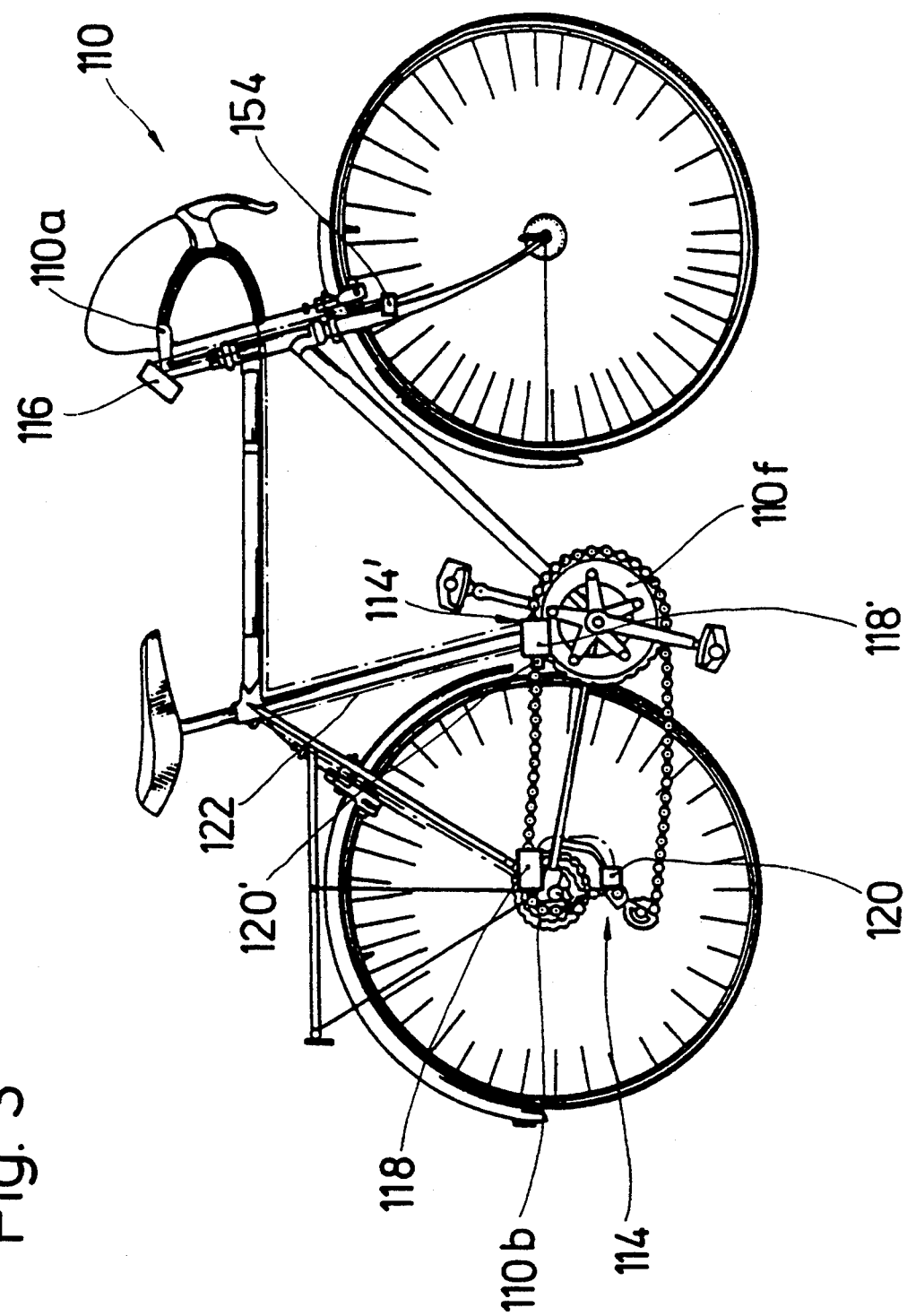
FIG. 3, a view analogous to FIG. 1 of a bicycle equipped with two adjustment devices.

A second bicycle equipped with a control device is shown in FIG. 3, where analogous parts are provided with the same reference numerals as in FIG. 1, but increased by the number 100. This bicycle will be described below only to the extent that it differs from the bicycle shown in FIG. 1. Reference is made to the above specification in other respects.

The signal transmitter 116 disposed on the handlebars 110a of the bicycle 110 illustrated in FIG. 3 is connected with two chain transfer devices 114 and 114'. The chain transfer device 114 is disposed in the area of the rear wheel hub 110b of the bicycle, while the chain transfer device 114' is disposed in the area of the large sprocket wheel 110f. The two control units 118 and 118' are connected with the signal transmitter 116 via a signal line loop 122 embodied as a data bus. The above described calibration of the two chain transfer devices 114 and 114' is performed separately for the two and in a manner analogously to the above described calibration method.

Starting with a shift request entered by the rider, the signal monitoring unit of the signal transmitter 116 determines the appropriate shift commands for the respective chain transfer device 114, 114'. These shift commands are sequentially issued, together with an identification code, to the appropriate chain transfer device, for example the chain transfer device 114. The signal is received by all control units 118, 118' of the chain transfer device. The addressed control unit, in this case the control unit 118 of the chain transfer device 114, recognizes the identification code in the signal as its own address and reads in the shift command, sends an acknowledgement to the signal transmitter 116 and executes the shift command which was sent. The other chain transfer device, in this case the chain transfer device 114', ignores the shift command. After transmitting the acknowledgement, the signal line 122 is open again for further signal transmissions, for example the transmission of the shift command to the other chain transfer device 114'.

While specific embodiments of the invention have been shown and described in detail to illustrate the application of the inventive principles, it will be understood that the invention may be embodied otherwise whithout departing from such principles.

The reference numerals in the claims are only used for facilitating the understanding and are by no means restrictive.

We claim:

1. An electrical derailleur device for a bicycle, comprising:
    a chain actuating element carrying a derailleur chain wheel and being displaceable to effect gear switching by positioning a chain for engagement with a respective gear wheel of a plurality of gear wheels;
    a drive means for displacing the chain actuating element;
    a presetting means for presetting at least one target value of a parameter indicating a displacing position of said chain actuating element for each of the plurality of gear wheels, said target value corresponding to a displacing position in which said gear switching to a respective gear wheel is effected;
    a control means for manually commanding gear switching to a desired gear wheel of said plurality of gear wheels, wherein said control means is connected to said presetting means for controlling said drive means in correspondence with a desired target value corresponding to said desired gear wheel;
    a sensor means for detecting an actual displacing position of said chain actuating element and for providing a sensor signal corresponding to said actual displacing position, wherein said sensor means is arranged at or adjacent to said chain actuating element and connected to said control means;
    a moving means for moving, in an adjustment mode, said chain actuating element to an adjusted displacing position for a respective one of said gear wheels, of which engagement with said chain is to be adjusted; and
    a storing commanding means for commanding storage in said presetting means said sensor signal provided by said sensor means corresponding to said adjusted displacing position of said chain actuating element as an adjusted target value.

2. An electrical derailleur device according to claim 1, wherein said presetting means presets an upshift target value and a downshift target value for each of the plurality of gear wheels, said upshift target value being stored in said presetting means after said moving means has moved the chain actuating element in said adjustment mode to said adjusted displacing position in an upshift movement, and said downshift target value being stored in said presetting means after said moving means has moved said chain actuating element in said adjustment mode to said adjusted displacing position in a downshift movement.

3. An electrical derailleur device according to claim 1, wherein said presetting device is an erasable and reprogrammable read-only memory device.

4. An electrical derailleur device according to claim 3, wherein said control means further comprises a controlling microchip operatively connected to said read-only memory device.

5. An electrical derailleur device according to claim 3, wherein said control means further comprises a controlling microchip integrated with said read-only memory device.

6. An electrical derailleur device according to claim 1, wherein said control means further comprises a comparator means for comparing said actual displacing position with said desired target value corresponding to said desired gear wheel, wherein said control means controls the drive means such as to displace said chain actuating element when said comparator means determines that the actual displacing position is not equal to said desired target value, and wherein said control means controls said drive means to stop displacing said chain actuating element when said comparator means determines that said actual displacing position is equal to said desired target value.

7. An electrical derailleur device according to claim 1, wherein the control means further comprises a timer means for timing a predetermined time interval, wherein said timer means is reset and started by said control means when said control means controls said drive means to start displacing said chain actuating element, and, when said predetermined time interval has elapsed, said control means controls said drive means to stop displacing said chain actuating element.

8. An electrical gear shifting device for a bicycle having at least one electrical derailleur device comprising:
    a chain actuating element carrying a derailleur chain wheel and being displaceable to effect gear switching by positioning a chain for engagement with a respective gear wheel of a plurality of gear wheels;
    a drive means for displacing said chain actuating element;
    a presetting means for presetting at least one target value of a parameter indicating a displacing position of said chain actuating element for each of said plurality of gear wheels, said target value corresponding to a displacing position in which said gear switching to a respective gear wheel is effected;
    a control means for manually commanding gear switching to a desired gear wheel of said plurality of gear wheels, wherein said control means is connected to said presetting device for controlling said drive means in correspondence with a desired target value corresponding to said desired gear wheel;
    a sensor means for detecting an actual displacing position of said chain actuating element and for providing a sensor signal corresponding to said actual displacing position, wherein said sensor means is arranged at or adjacent said chain actuating element and connected to said control means;
    a moving means for moving, in an adjustment mode, said chain actuating element to an adjusted displacing position for a respective one of said gear wheels, of which the engagement with said chain is to be adjusted; and a storing commanding means for commanding storage in said presetting means said sensor signal provided by said sensor means corresponding to said adjusted displacing position of said chain actuating element as an adjusted target value.

* * * * *